(12) United States Patent
Harrang

(10) Patent No.: US 8,543,058 B2
(45) Date of Patent: Sep. 24, 2013

(54) SYSTEMS AND METHODS FOR OPTIMIZING SHORT RANGE WIRELESS COMMUNICATIONS WITHIN A LARGER WIRELESS NETWORK

(75) Inventor: Jeffrey P Harrang, Sammamish, WA (US)

(73) Assignee: Eden Rock Communications, LLC, Bothell, WA (US)

( * ) Notice: Subject to any disclaimer, the term of this patent is extended or adjusted under 35 U.S.C. 154(b) by 654 days.

(21) Appl. No.: 12/695,866

(22) Filed: Jan. 28, 2010

(65) Prior Publication Data

US 2010/0216403 A1    Aug. 26, 2010

Related U.S. Application Data

(60) Provisional application No. 61/155,056, filed on Feb. 24, 2009.

(51) Int. Cl.
*H04B 7/00* (2006.01)

(52) U.S. Cl.
USPC ......... 455/41.2; 455/41.3; 455/444; 455/522; 455/435.1; 455/452.1; 370/331; 370/338; 370/328; 370/401; 370/431

(58) Field of Classification Search
USPC ............. 455/41.2, 41.3, 444, 522, 13.4, 3.05, 455/452.1, 435.1, 435.2; 370/331, 332, 338, 370/328, 401, 431, 439
See application file for complete search history.

(56) References Cited

U.S. PATENT DOCUMENTS

| | | | | |
|---|---|---|---|---|
| 7,003,303 | B2 * | 2/2006 | Khawand et al. | 455/452.1 |
| 7,468,969 | B2 * | 12/2008 | Zuniga | 370/338 |
| 7,869,413 | B2 * | 1/2011 | Zuniga | 370/338 |
| 8,095,164 | B2 * | 1/2012 | Bednekoff et al. | 455/522 |
| 8,238,921 | B2 * | 8/2012 | Chang et al. | 455/444 |
| 2004/0259544 | A1 * | 12/2004 | Amos | 455/435.1 |
| 2008/0146154 | A1 | 6/2008 | Claussen et al. | |
| 2009/0291690 | A1 | 11/2009 | Guvenc et al. | |

FOREIGN PATENT DOCUMENTS

| | | |
|---|---|---|
| EP | 2104385 A1 | 9/2009 |
| JP | 2008-252253 A | 10/2008 |

OTHER PUBLICATIONS

International Search Report and Written Opinion for PCT/US10/22415, dated Jan. 28, 2010.

* cited by examiner

*Primary Examiner* — April G Gonzales

(57) ABSTRACT

A networked computing system that is configured to optimize short-range wireless communications within a distributed wireless communications network. The networked computing system may include one or more base stations, a transceiver device having shorter range wireless communications capability than the base station(s), and one or more user equipment capable of communicating with the transceiver device and the base station(s). Within the networked computing system, the transceiver device is configured to: transmit a signal to detect a regional base station and then determine at least one operating parameter based on communications characteristics associated with the detected regional base station(s). The operating parameter(s) may be a non-interfering operating power levels or a modulation and coding scheme level utilized to facilitate communications between the transceiver device and the user equipment.

20 Claims, 11 Drawing Sheets

600

| Base Station Identification | Radio Power Operating Threshold | Modulation & Coding Scheme |
|---|---|---|
| NBS_1 | TX_Threshold-Limit_1 | MCS_Limit_1 |
| NBS_2 | TX_Threshold-Limit_2 | MCS_Limit_2 |
| NBS_3 | TX_Threshold-Limit_3 | MCS_Limit_3 |
| NBS_4 | TX_Threshold-Limit_4 | MCS_Limit_4 |
| . | . | . |
| . | . | . |
| . | . | . |
| NBS_n | TX_Threshold-Limit_n | MCS_Limit_n |

— 602

| MIN { TX_Threshold-Limit_1, ..., TX_Threshold-Limit_n} |
|---|
| MIN {MCS_Limit_1, ..., MCS_Limit_n} |

SYSTEMS AND METHODS FOR OPTIMIZING SHORT RANGE WIRELESS COMMUNICATIONS WITHIN A LARGER WIRELESS NETWORK

CROSS REFERENCE TO RELATED APPLICATIONS

The present application claims the benefit of U.S. Provisional Application No. 61/155,056, filed Feb. 24, 2009.

FIELD OF THE INVENTION

The field of the present invention generally relates to systems and methods that facilitate dynamic optimization of short-range wireless communications within a larger wireless network. This optimization is intended to reduce the possibility of communications interference amongst a variety of network transceiver devices and base stations that simultaneously operate within the same geographic region of a network.

BACKGROUND OF THE INVENTION

Today, an increasing number of short-range wireless transceiver devices (e.g., femtocell and picocell devices), operating on licensed frequency spectra, are being deployed within larger wireless networks to improve the quality of wireless communications at various subscriber site locations. Often, network transceiver devices are configured to connect with a particular service provider network using various common wireline communications technologies, including, but not limited to: fiber optic, DSL, powerline, and/or coaxial cable. These transceiver devices may be distributed in such a way to provide short-range wireless communications services to single-family homes, public businesses (e.g., such as Starbucks® coffee shops or McDonalds® restaurants), to particular floors within an office building, etc.

Modern wireless network infrastructures can be improved by reducing the network traffic or loads experienced by wide coverage area base stations (e.g., macrocell and microcell base stations) residing within heavily populated regions of a data communications network (e.g., in most metropolitan areas). With the present-day evolution of wireless communications networks, this can be achieved by deploying large numbers of short-range wireless transceiver devices (e.g., femtocell and/or picocell devices) that can collectively pull significant amounts of traffic (e.g., residential traffic) away from heavily loaded network base stations. This traffic distribution phenomenon can be particularly beneficial during peak periods of network use where wide-area service provider resources (e.g., bandwidth provided by a macrocell base station) may be significantly burdened.

Expanding a network's resources to include short-range wireless alternatives in highly populated areas can significantly reduce periods of network congestion between various links in a larger data communications network. This can improve a service provider network's Quality of Service (QOS) as well as network service subscribers' collective Quality of Experience (QOE) within a particular portion of a data communications network. Negative effects associated with poor QOS and poor QOE (e.g., conditions largely caused by congestion and/or interference), which can be mitigated by adding a substantial amount of short-range wireless transceiver devices to network infrastructure, may include: queuing delay, data loss, as well as blocking of new and existing network connections for certain network subscribers.

Most self-contained, short-range transceiver device networks (e.g., femtocell and/or picocell networks) reside residentially within larger wireless networks that include a variety of network base station types (e.g., macrocell, microcell, and optionally picocell base stations) operating on the same or similar licensed frequency spectra. This heterogeneous communications network topology can facilitate the substitution of local transceiver device service for communications services formerly provided by larger area network base stations within user-selected regions of a service provider network. For example, when a user equipment, such as a cellular phone or a PDA device, is within range of a local femtocell transceiver device, the user equipment may selectively or automatically be configured to transition from a serving macrocell base station to the local femtocell device, such that their network service seamlessly transitions to a local, dedicated service option that typically offers better communications capability than the macrocell base station within a very limited coverage area.

Although adding a variety of short-range wireless communications transceivers to an existing network can improve network throughput in most metropolitan areas, the unplanned placement of these short-range transceiver devices (e.g., femtocell and/or picocell devices) within a given network topology can also have detrimental effects on wireless communications quality within a service provider network. In particular, joining or relocating transportable transceiver devices to the network may inadvertently cause interference amongst the transportable transceiver devices, neighboring base stations, and various user equipment of a wireless network based on existing deployments of network base stations (e.g., macrocell and/or microcell base stations).

Accordingly, without careful frequency and/or radio power level planning within particular regions of a data communications network, both short-range transceiver device and wide-range base station communications could suffer from detrimental interference scenarios. In some problematic scenarios, the interference may be associated with co-channel interference and in other scenarios the interference may be associated with adjacent channel interference. Typically, it is not possible for service providers to keep track of, or even properly plan for, the addition and/or relocation of hundreds or even thousands of transportable short-range transceiver devices residing within portions of a larger data communications network.

Next generation cellular networks (e.g., 4G communications networks) may be able to take advantage of system redundancy associated with heterogeneous mixtures of short-range wireless transceiver devices collocated with wider-range network base stations. These new deployment topologies may result in robust mixtures of network cell coverage within regions of overlapping wireless service. In particular, many modern, low power transceiver devices (e.g., femtocell Home eNodeB devices) are readily transportable within a communications network by end users. This mobility creates the possibility that short-range transceiver devices may be moved to unpredictable locations where their operation could potentially produce substantial interference to surrounding network infrastructure, unless their maximum radio power levels were constrained to reduce unwanted instances of network interference.

Presently, there is a need for improved systems and methods that facilitate ad-hoc deployments of short-range wireless transceiver devices within larger wireless communications networks. It would be beneficial if these deployments could occur while ensuring that the operation of transportable transceiver devices will not interfere with or significantly degrade existing, overlapping network infrastructure (e.g., including static macrocell, microcell, and/or picocell base stations). To date, it has been very difficult for service providers to restrict portable transceiver devices to particular geographic locations (e.g., to lock a transceiver device to a subscriber's residence or place of business). Accordingly, it would also be desirable if these improved systems and methods could be managed by subscriber-deployed equipment (e.g., by transceiver devices that service providers deploy to their network subscribers). This distribution would advantageously affect quality optimization processes amongst a wireless network's resources, such that a particular service provider entity would not need to be independently responsible for impractical resource planning and management tasks, created by unexpected customer relocation and operation of short-range network communications equipment.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with existing data communications systems that employ short-range wireless communications within larger wireless networks, the present invention discloses improved data communications systems and methods for optimizing short-range wireless communications in order to reduce the possibility of radio communications channel interference within a regional area of a network cell. The present invention may include a networked computing system that has one or more base stations, a transceiver device having shorter-range wireless communications capability than the base station(s), one or more user equipment that is capable of communicating with the transceiver device and the base station(s). The transceiver device may be configured to transmit a signal to detect a regional base station and then determine one or more operating parameters based on communications characteristics associated with the detected regional base station.

In accordance with another aspect of the present invention, the operating parameter(s) may be a non-interfering operating power level or a modulation and coding scheme level utilized to facilitate communications between the transceiver device and a user equipment.

In accordance with a further aspect of the present invention, the transceiver device may determine the operating parameter(s) by increasing its transmit signal level until the regional base station responds.

In accordance with yet another aspect of the present invention, the operating parameter(s) is utilized to set operating levels for communication with a user equipment when the user equipment first attempts to communicate with the transceiver device.

In accordance with a further aspect of the present invention, the transceiver device may instruct a user equipment to communicate with the regional base station to determine one or more refined communications operating level(s) based on communications characteristics associated with the regional base station.

In accordance with another aspect of the present invention, the refined communications operating level(s) is utilized to facilitate improved communications between the transceiver device and the user equipment, such that the transceiver device and the user equipment can communicate within the distributed wireless communications network without causing substantial interference.

In accordance with another aspect of the present invention is a computer-readable medium encoded with computer-executable instructions for optimizing short-range wireless communications within a distributed wireless communications network, which when executed, performs a method including: transmitting a signal to detect a regional base station; and then determining one or more operating parameters based on communications characteristics associated with the detected regional base station. The transceiver device typically has shorter-range wireless communications capability than the regional base station.

In accordance with a further aspect of the present invention is a computer-implemented method for optimizing short-range wireless communications within a distributed wireless communications network. The method includes: transmitting a signal to detect a regional base station and then determining one or more operating parameters based on communications characteristics associated with the detected regional base station. The transceiver device typically has shorter-range wireless communications capability than the regional base station.

In accordance with yet another aspect of the present invention is a transceiver device that includes one or more memories, a communications component, and one or more processors. The transceiver device may be configured to transmit a signal to detect a regional base station with the communications component and then determine one or more operating parameters based on communications characteristics associated with the detected regional base station.

In accordance with a further aspect of the present invention, the transceiver device may be further configured to determine a non-interfering operating power level or a modulation and coding scheme level utilized to facilitate communications between itself and a user equipment by increasing its transmit signal level until the regional base station responds.

BRIEF DESCRIPTION OF THE DRAWINGS

Preferred and alternative examples of the present invention are described in detail below with reference to the following Figure drawings:

FIG. 6 illustrates a generated listing of neighboring base station communications characteristics in accordance with an embodiment of the present invention;

DETAILED DESCRIPTION

Figure 1:
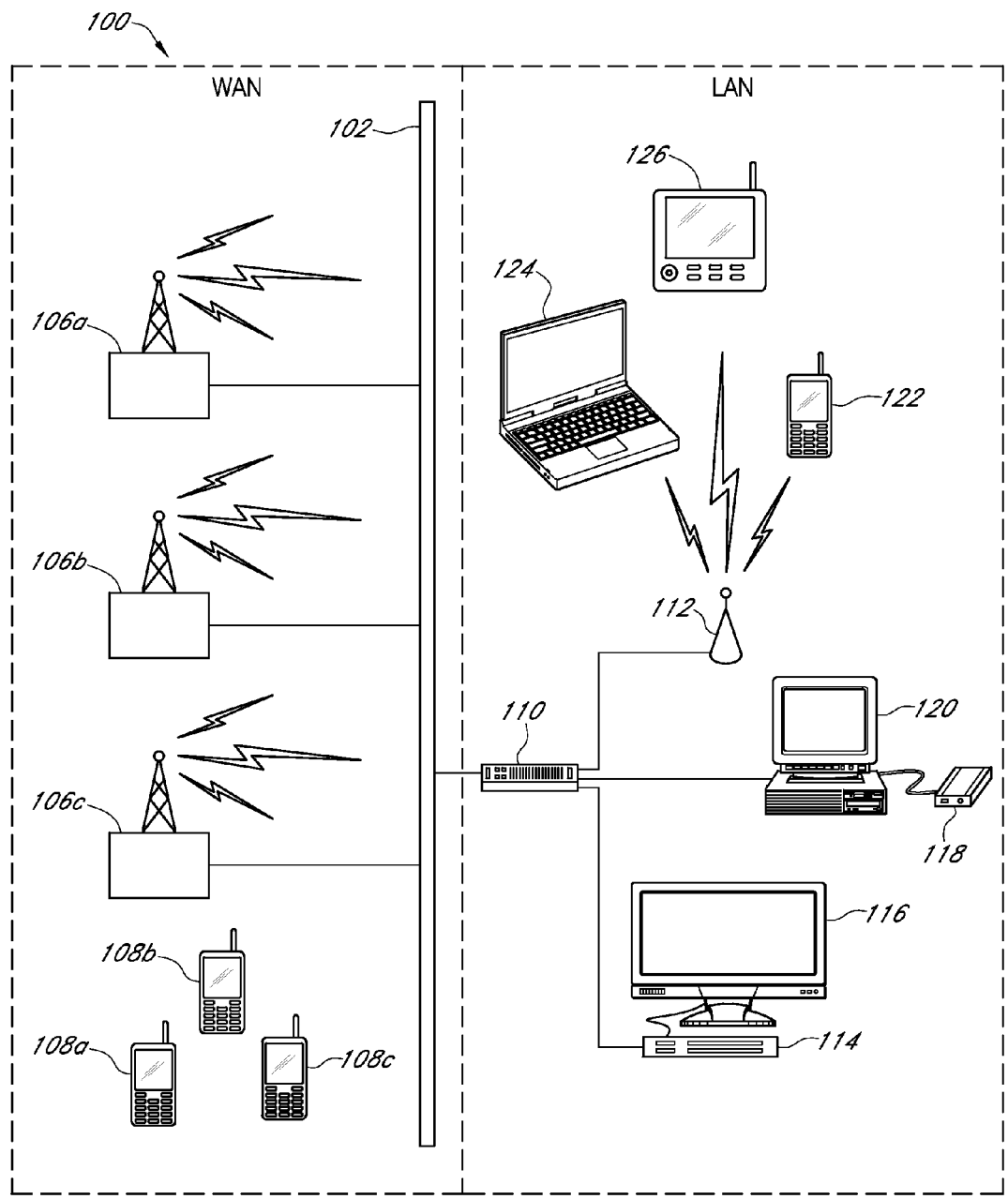
FIG. 1 illustrates a perspective view of a distributed data communications system in accordance with an embodiment of the present invention.

In accordance with an exemplary embodiment of the present invention, FIG. 1 illustrates a networked computing system 100 including various wireline and wireless computing devices that may be utilized to implement any of the short-range wireless communications optimization processes associated with various embodiments of the present invention. The networked computing system 100 may include, but is not limited to, a group of remote base station devices 106a-c, any one of which may be associated with a macrocell, a microcell, or a picocell base station that may each be a neighboring base station to one or more short-range transceiver devices 112 (e.g., a femtocell or a picocell device) within a particular region of the networked computing system 100; a data communications network 102, including both Wide Area Network (WAN) and Local Area Network (LAN) portions; a variety of wireless user equipment, including: cellular phone or PDA devices 108a-c, 122, a laptop or netbook computer 124, an electronic book device 126, along with any other common portable wireless computing device well known in the art (e.g., handheld gaming units, personal music players, video recorders, etc.) that are capable of communicating with the data communications network 102 utilizing one or more of the remote base stations 106a-c, the short-range transceiver device 112, or any other common wireless or wireline network communications technology; one or more network gateways or switch devices 110 that can facilitate data communications processes within the LAN and between the LAN and the WAN of the data communications network 102; a television device 116 (e.g., a high definition LCD or Plasma television) that is optionally connected to a multi-media device 114 (e.g., a set-top box, digital video recorder (DVR), or Blu-Ray™ player device); and a desktop computer 120 optionally connected to an external hard-drive device 118.

In an embodiment, the remote base station devices 106a-c, the short-range transceiver device 112 (e.g., a femtocell or a picocell device), or any of the user equipment (108a-c, 114, 116, 118, 120, 122, 124, or 126), may be configured to run any well-known operating system, including, but not limited to: Microsoft® Windows®, Mac OS®, Google® Chrome®, Linux®, Unix®, or any well-known mobile operating system, including Symbian®, Palm®, Windows Mobile®, Google® Android®, Mobile Linux®, MXI®, etc. In an embodiment, any of the remote base stations 106a-c may employ any number of common server, desktop, laptop, and personal computing devices.

In an embodiment, the user equipment (108a-c, 122, 124, or 126) may include any combination of common mobile computing devices (e.g., laptop computers, netbook computers, cellular phones, PDAs, handheld gaming units, electronic book devices, personal music players, MiFi™ devices, video recorders, etc.), having wireless communications capabilities employing any common wireless data commutations technology, including, but not limited to: GSM™, UMTS™, LTE™, LTE Advanced™, Wi-Max™, Wi-Fi™, etc.

In an embodiment, either of the LAN or the WAN portions of the data communications network 102 of FIG. 1 may employ, but are not limited to, any of the following common communications technologies: optical fiber, coaxial cable, twisted pair cable, Ethernet cable, and powerline cable, along with any wireless communication technology known in the art. In an embodiment, any of the remote wireless base station 106a-c, the wireless user equipment (108a-c, 122, 124, or 126), as well as any of the other LAN connected computing devices (110, 114, 116, 118, or 120) may include any standard computing software and hardware necessary for processing, storing, and communicating data amongst each other within the networked computing system 100. The computing hardware realized by any of the network computing system 110 devices (106a-c, 108a-c, 110, 112, 114, 116, 120, 122, 124, or 126) may include, but is not limited to: one or more processors, volatile and non-volatile memories, user interfaces, transcoders, and wireline and/or wireless communications transceivers, etc.

Further, any of the networked computing system 100 devices (106a-c, 108a-c, 110, 112, 114, 116, 120, 122, 124, or 126) may be configured to include one or more computer-readable media (e.g., any common volatile or non-volatile memory type) encoded with a set of computer readable instructions, which when executed, performs a portion of any of the short-range wireless communications optimization processes associated with various embodiments of the present invention.

In context with various embodiments of the present invention, it should be understood that wireless communications coverage (e.g., cellular coverage) for various data communication network cells typically vary amongst different service provider networks based on the technologies deployed within various network cells. However, as would be understood by those skilled in the Art, macrocells typically provide the largest wireless coverage area for licensed frequency spectra, followed by microcells, then picocells, and lastly femtocells, which provide the smallest coverage area of the network cell types.

By way of example, in a typical distributed data communications network, a macrocell base station may provide a wireless coverage area ranging between one to five kilometers; a microcell base station may provide a coverage area ranging between one-half to one kilometer; a picocell base station/device may provide a coverage area ranging between 100 to 500 meters; and a femtocell base station/device may provide a coverage area of less than 100 meters. In accordance with various embodiments of the present invention, a wide-area or wide-range base station may be considered to be any of a macrocell, a microcell, or a picocell base station, depending on the reference coverage area provided by the small-area or short-range wireless transceiver device(s) (e.g., a femtocell or a picocell device) to which the base station coverage area is being compared. Similarly, in accordance with various embodiments of the present invention, a small-area or short-range wireless transceiver device may be considered to be either a femtocell (e.g., a short-range base station device such as a Home eNodeB) or a picocell device, depending on the reference coverage area provided by neighboring wider coverage area base stations (e.g., macrocell, microcell, or picocell base stations) to which the transceiver device coverage area is being compared.

Figure 2:
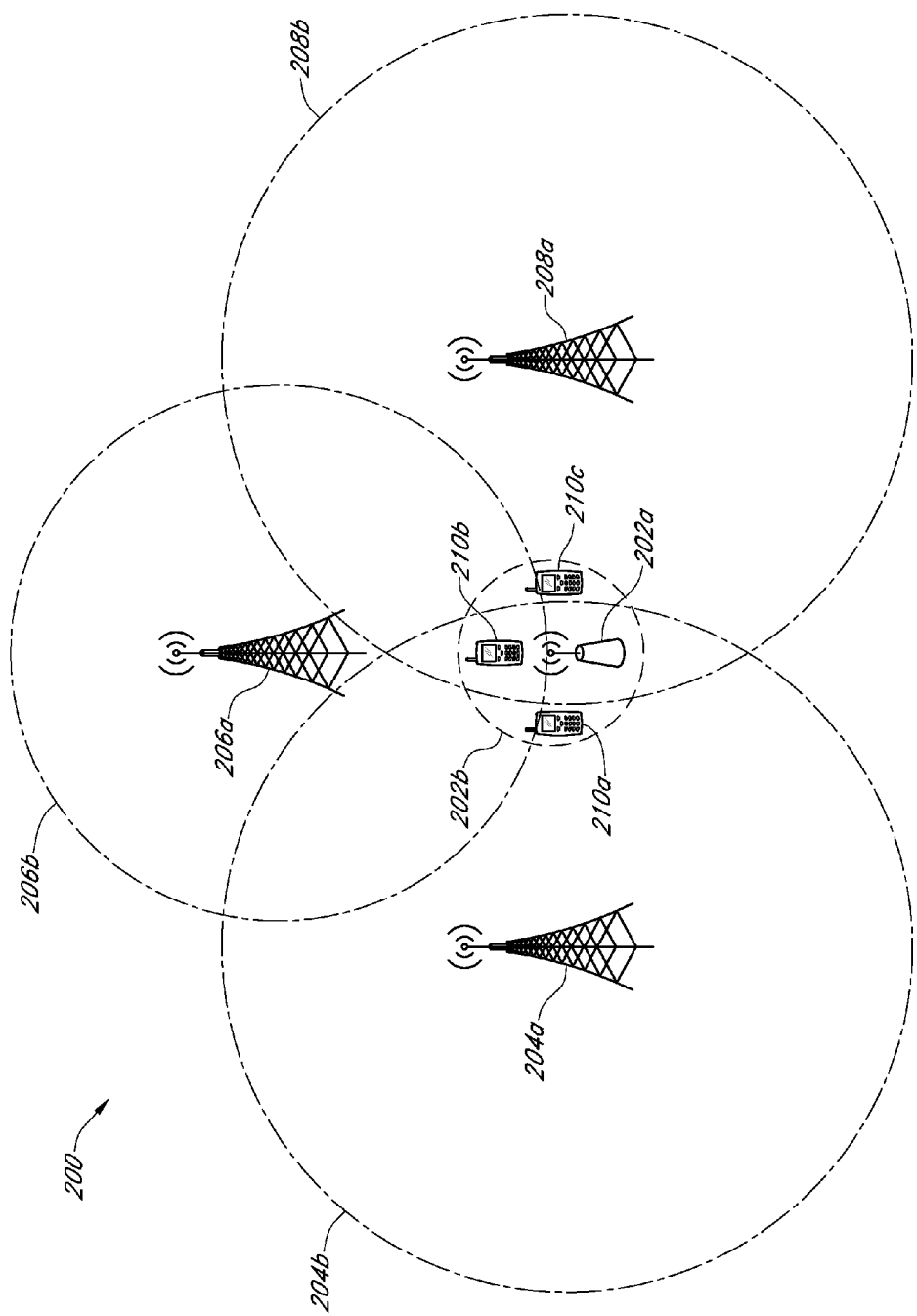
FIG. 2 illustrates a perspective view of a data communications network topology showing communications coverage areas for network devices in accordance with an embodiment of the present invention.

FIG. 2 illustrates a particular data communications network topology 200 in accordance with an embodiment of the present invention. The data communications network topology 200 includes, but is not limited to: multiple base stations 204a, 206a, and 208a (any one of which may be a macrocell, microcell, or picocell base station); various wide-range wireless communications coverage areas 204b, 206b, and 208b (represented by circular dashed lines) that respectively relate to wireless coverages provided by the base stations 204a, 206a, and 208a of the data communications network; transceiver device 202a (which may be a femtocell or picocell device); a short-range wireless communications coverage area 202b (represented by circular dashed line) that relates to wireless coverage provided by the transceiver device 202a; and multiple user equipment 210a-c (e.g., any of the WAN or LAN wireless devices 108a-c, 122, 124, or 126) that may reside within one or more of the base station coverage areas 204b, 206b, 208b and/or the transceiver device coverage area 202b.

In an embodiment, user equipment 210a may simultaneously reside within the wireless communications coverage area 202b of the transceiver device 202a as well as within the wireless communications coverage areas 204b and 206b of the base stations 204a, 206a. The user equipment 210b may simultaneously reside within the wireless communications coverage area 202b of the transceiver device 202a as well as within the wireless communications coverage areas 204b, 206b, and 208b of the base stations 204a, 206a, and 208a. Further, the user equipment 210c may simultaneously reside within the wireless communications coverage area 202b of the transceiver device 202a as well as within the wireless communications coverage areas 206b, and 208b of the base stations 206a and 208a. In accordance with an embodiment of the present invention, in any of these scenarios, a user equipment (any of user equipment 210a-c) may configured/optimized to communicate with the transceiver device 202a at dynamically determined operating power levels/modulation and coding schemes (MCSs) that do not substantially interfere with any neighboring base stations (204a, 206a, or 208a).

In accordance with embodiments of the present invention, a network base station is considered a "neighboring" base station to a particular transceiver device 202a or a user equipment (any of user equipment 210a-c) when wireless communications coverage areas overlap between or amongst base stations 204a, 206a, 208a and other data communications network devices (e.g., user equipment 210a-c and/or transceiver devices 202a). For example, from the perspective of the user equipment 210a, base stations 204a and 206a may each be considered neighboring base stations. Similarly, from the perspective of the transceiver device 202a, base stations 204a, 206a and 208a may each be considered neighboring base stations. As will be further described herein, the short-range wireless communications optimization processes associated with various embodiments of the present invention generally involve a transceiver device (e.g., 112 or 202a) and/or various user equipment (e.g., any of 108a-c, 122, 124, 126, or 210a-c) communicating with neighboring base stations (e.g., 106a-c, 204a, 206a, or 208a) in order to independently or collaboratively affect the determination of short-range wireless communications device operating levels (e.g., the operating power level/MCS for transceiver device 112 or 202a).

Figure 3:
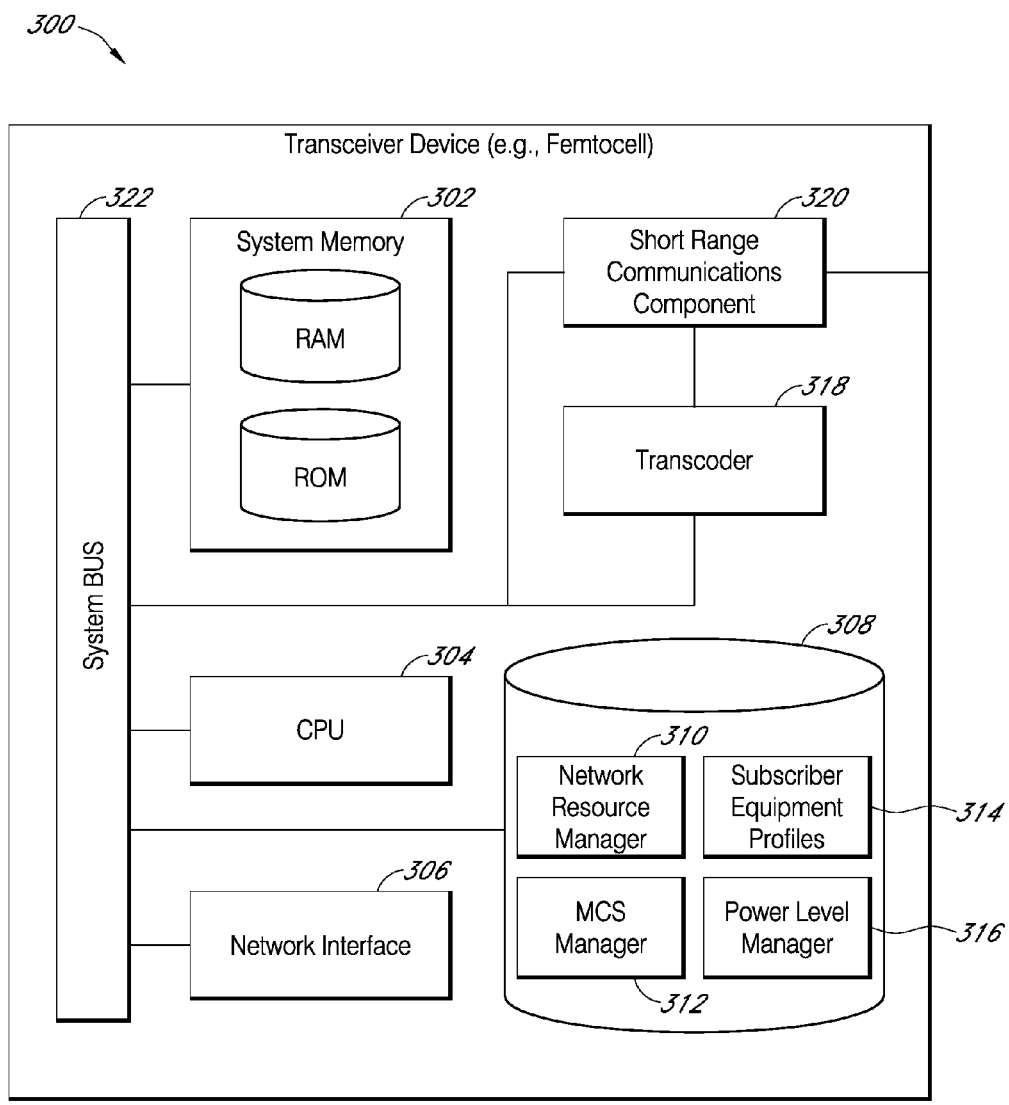
FIG. 3 illustrates a block diagram view of a transceiver device in accordance with an embodiment of the present invention.

FIG. 3 illustrates a block diagram view of a transceiver device 300 (e.g., a femtocell or picocell device) that may be representative of either the short-range transceiver device 112 in FIG. 1, or the short-range transceiver device 202a in FIG. 2. In accordance with an embodiment of the present invention, the transceiver device 112, 202a may include, but is not limited to, one or more data processing devices including a central processing unit (CPU) 304. In an embodiment, the CPU 304 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 304 is responsible for executing all computer programs stored on the transceiver device's 300 volatile (RAM) and nonvolatile (ROM) system memories, 302 and 308.

The transceiver device 300 may also include, but is not limited to a network interface 306 that can facilitate the transceiver device 300 communicating across either the LAN and/or WAN portions the data communications network 102; a software/database repository 308 including: a network resource manager component 310, a MCS manager component 312, a repository of subscriber equipment profiles 314 (profiles pertaining to user equipment 108a-c, 122, 124, 126, or 210a-c), and a device power level manager component 316; a transcoder 318 for formatting or reformatting incoming and outgoing data communications; a short-range wireless communications component 320 for transmitting and receiving network communications from various user equipment (108a-c, 122, 124, 126, or 210a-c) utilizing the data communication network 102 of the networked computing system 100; and a system bus 322 that facilitates data communications amongst all the hardware resources of the transceiver device 300.

In accordance with an embodiment of the present invention, the network resource manager component 310 may be configured to collaborate with the device power-level manager component 316 and the MCS manager component 312 in order establish and control various short-range wireless communications optimization processes associated with embodiments of the present invention. It should be understood that the network resource manager component 310, the device power-level manager component 316 and the MCS manager component 312 may all be part of the same or segmented software application(s) deployed on a particular transceiver device 300.

By way of example, in an embodiment, the network resource manager component 310 may automatically respond to a transceiver device 300 power-on event by initially instructing the MCS manager component 312 to set a test MCS level to the lowest order MCS available (e.g., a MCS employing Binary Phase Shift Keying or BPSK, having 1 bit/symbol) to improve detection and/or measurement accuracy for various subsequent neighboring base station detection processes. After setting the MCS to the most robust level available (the lowest order MCS) for the transceiver device 300, the network resource manager component 310 may then instruct the device power-level manager component 316 to increase its radio power operating level (e.g., either incrementally or continuously) until one or more neighboring base stations responds to its transmitted registration request. In this way, the network resource manager component 310 can collaboratively work with the MCS manager component 312 and the device power-level manager component 316 to determine operating levels of the transceiver device 300 (e.g., operating power levels/MCSs) that will cause the least interference for one or more neighboring base stations during a short-range communications optimization process.

As would be understood by those skilled in the art, the higher a modulation order employed in a MCS, the more data that can be carried over a communications link (measured in terms of bits/symbol) during data transmissions. However, for each additional bit encoded in a symbol, the symbol states become less distinct from each other. This can make it more difficult for a receiver (e.g., a neighboring base station) to detect, interpret, and respond to a received communications at barely detectable power levels, such as a low radio power level registration request. This is why for testing/detection purposes, utilizing the lowest order MCS is the most ideal selection for accurately detecting neighboring base stations and optimizing short-range power operating levels of the transceiver device in response to those detections.

Figure 4:
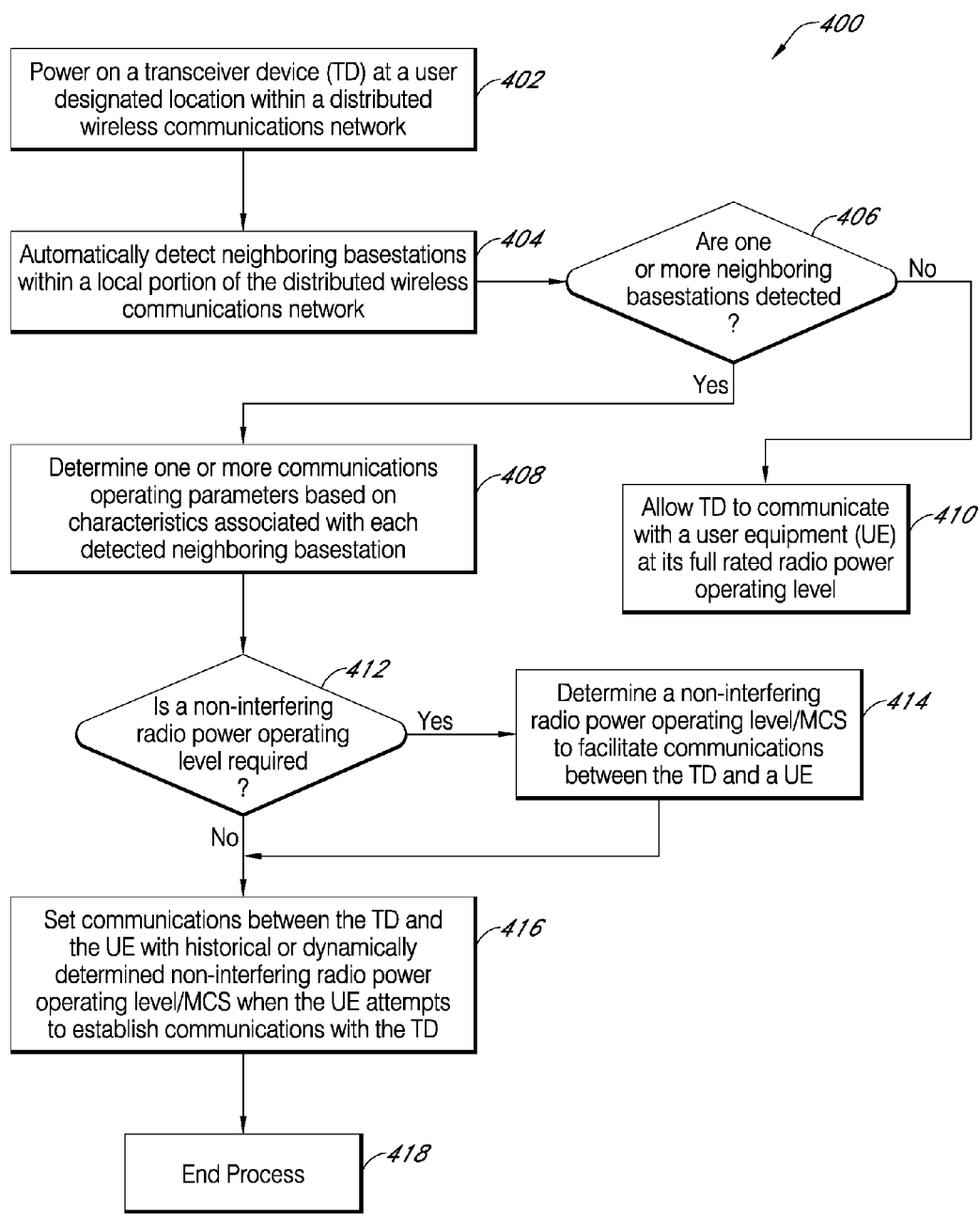
FIG. 4 illustrates a flow diagram depicting processes associated with optimizing short-range wireless communications characteristics (relating to radio power operating levels/MCSs) in accordance with an embodiment of the present invention.

FIG. 4 illustrates a flow diagram 400 depicting a transceiver device 300 operating level optimization process associated with an embodiment of the present invention. It should be understood that this process 400 could be executed using one or more computer-executable programs stored on one or more computer-readable media located on any of the network computing system's 100 transceiver devices 112, 202a, 300 or collaboratively on any of the network base stations 106a-c, 204a, 206a, and 208a (or on any other common service provider device known the Art) of FIGS. 1-3. At block 402, a transceiver device (e.g., transceiver device 202a) is powered on (either locally by a user or remotely by a service provider entity) at a user-designated location within a distributed wireless communications network 402. Next at block 404 the transceiver device automatically detects neighboring base stations (e.g., any of base stations 204a, 206a of 208a) within a local portion of the distributed wireless communications network. The process then proceeds to decision block 406, where it is determined if one or more neighboring base stations were detected at block 404. If no neighboring base stations were detected at block 404, then there is no need to proceed with operation level optimization processes, because a user will generally wish to maximize local communications capabilities within network environments having little or no possibility of problematic interference. Accordingly, the process proceeds to block 410 where the transceiver device 300 is allowed to communicate with a user equipment (e.g., 108a-c, 122, 124, or 126) at the transceiver device's full rated radio power operating level.

However, if one or more neighboring base stations were detected at block 404, then the process proceeds from decision block 406 to block 408, where the transceiver device determines one or more communications operating parameters based on characteristics associated with each detected neighboring base station from block 404. Subsequently, the process proceeds to decision block 412 where it is determined if a non-interfering radio power operating level is required by the transceiver device or the service provider (e.g., by instructions emanating from the network resource manager component 310). If a non-interfering radio power operating level is required, then at block 414 a non-interfering radio power operating level/MCS is determined in order to facilitate communications between the transceiver device and a particular user equipment (e.g., 108a-c, 122, 124, or 126). Next the process proceeds to block 416. However if determination of a non-interfering radio power operating level is not required, then at block 416 communications between the transceiver device 300 and the user equipment (e.g., 108a-c, 122, 124, or 126) are set in accordance with a historical/default non-interfering radio power operating level/MCS or a newly determined non-interfering radio power operating level/MCS (e.g., based on the outcome of decision block 412), when the user equipment (e.g., 108a-c, 122, 124, or 126) attempts to establish communications with the transceiver device 300. Subsequently, the process ends at block 418.

Figure 5:
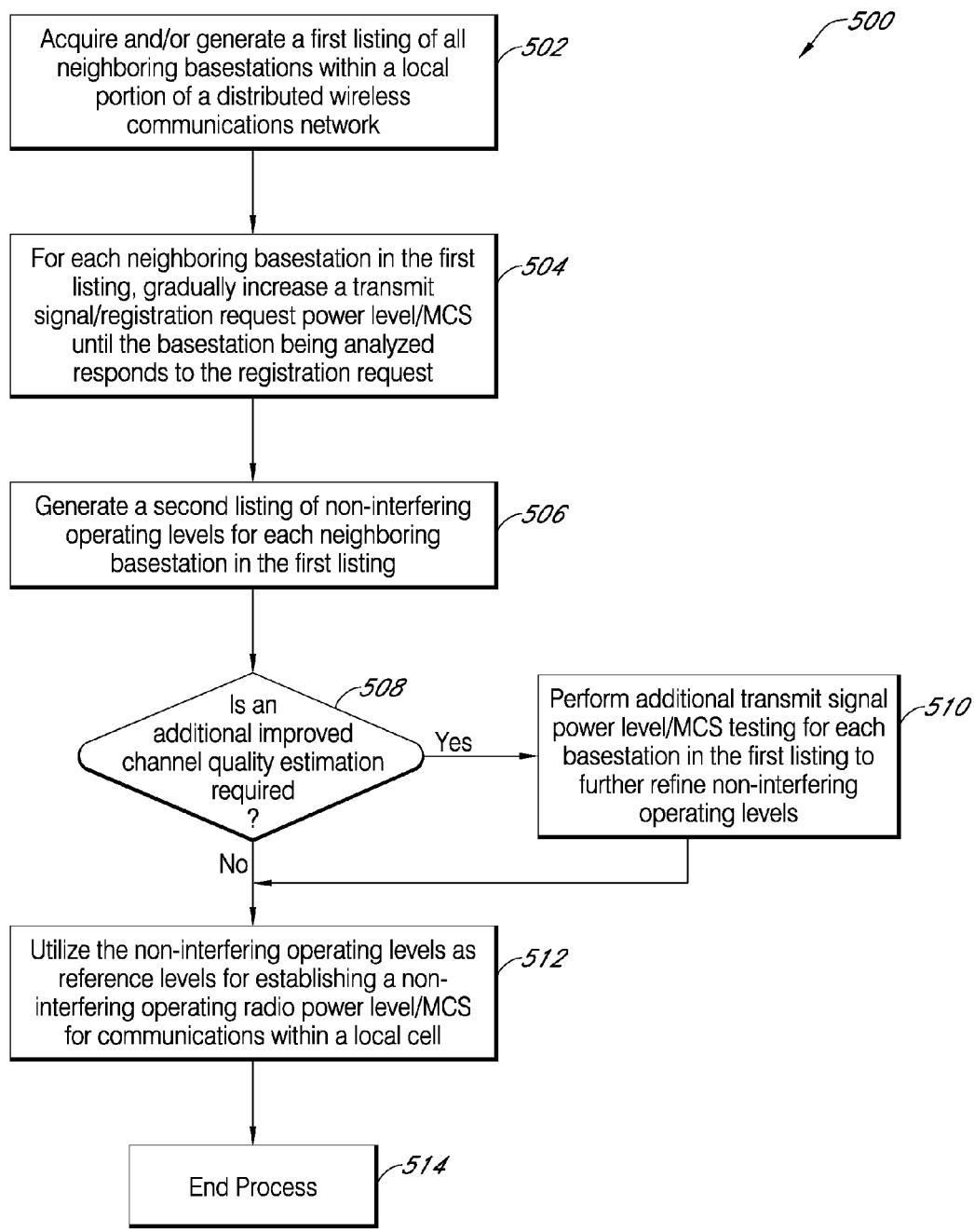
FIG. 5 illustrates a flow diagram depicting processes associated with optimizing short-range wireless communications characteristics for a transceiver device based on neighboring base station feedback in accordance with an embodiment of the present invention.

FIG. 5 illustrates a flow diagram 500 depicting a transceiver device 300 operating level optimization process, including a user equipment refinement process, associated with an embodiment of the present invention. It should be understood that this process 500 could be executed using one or more computer-executable programs stored on one or more computer-readable media located on any of the network computing system's 100 transceiver devices 112, 202a, 300 or collaboratively on any of the network base stations 106a-c, 204a, 206a, and 208a (or on any other common service provider device known the Art) of FIGS. 1-3. At block 502, a transceiver device 300 acquires and/or generates a first listing of all neighboring base stations 106a-c within a local portion of a distributed wireless communications network. Next at block 504, for each neighboring base station in the first listing (presuming at least one neighboring base station exists in the first listing) a transmit signal/registration request power level/MCS is gradually increased (e.g., either incrementally or continuously) until the base station being analyzed (e.g., any of network base stations 106a-c) responds to the registration request. Subsequently, at block 506 a second listing of non-interfering operating levels is generated for each neighboring base 106a-c station in the first listing based on the analyses of block 504.

Then at decision block 508 it is determined if an additional improved channel quality estimation is required. If it is determined that an additional improved channel quality estimation is required, the process proceeds to block 510, where additional transmit signal power level/MCS testing is performed (e.g., by a user equipment 108a-c, 122, 124, and 126 under instruction by either a transceiver device 300 or a service provider) for each base station 106a-c in the first listing to further refine non-interfering operating levels. However, if it is determined that an additional improved channel quality estimation is not required, then at block 512, the non-interfering operating levels are utilized by the transceiver device 300 (or optionally another service provider device) for establishing a non-interfering operating radio power level/MCS for communications within a local cell. Subsequently the process ends as block 514.

In accordance with various embodiments of the present invention, FIG. 6 depicts listings 600 associated with a neighboring base station parameters/characteristics listing 602 and a non-interfering operating levels listing 604. In an embodiment, the neighboring base station parameters/characteristics listing 602 may include neighboring base station identifications, neighboring base station radio power operating power levels/thresholds, and neighboring base station MCS levels for each detected or previously known neighboring base station 106a-c in the same regional area as a transceiver device 300. This listing 602, may be determined and/or utilized during various processes associated with any of flow diagram processes 400, 500, 1000, or 1100 depicted in FIGS. 4, 5, 10 and 11.

In an embodiment, the non-interfering operating level listing 604 may include the minimum radio power operating limit determined for the collective radio power operating levels of neighboring base stations 106a-c identified in the neighboring base station parameters/characteristics listing 602. This determination may be calculated by taking the minimum operating power level of a group of determined radio power limits for all neighboring base stations 106a-c. The non-interfering operating level listing 604 may further include the minimum neighboring base station MCS level determined for the collective base station MCS levels of neighboring base stations 106a-c identified in the neighboring base station parameters/characteristics listing 602. This determination may be calculated by taking the minimum base station MCS of a group of determined MCS limits for all neighboring base stations 106a-c.

Figure 7:
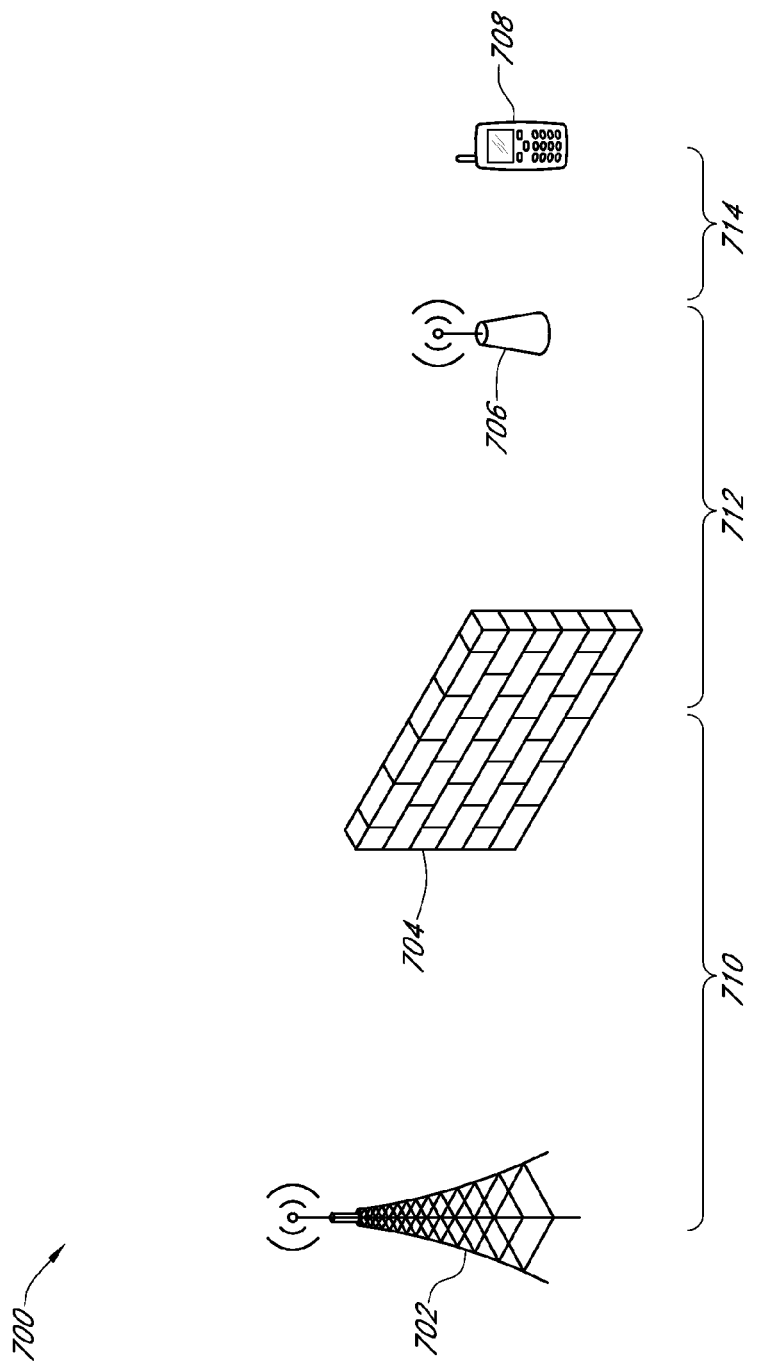
FIG. 7 illustrates a first near/far scenario that can occur amongst a user equipment, a transceiver device, and a base station that could occur in accordance with embodiments of the present invention.

FIG. 7 illustrates a first near-far scenario diagram 700 depicting a transceiver device 706, a neighboring base station 702, a radio communication obstruction 704 (represented by a brick wall), and a user equipment 708. This first near-far scenario 700 can occur in accordance with any of the embodiments of the present invention when both the user equipment 708 and the transceiver device 706 have the same obstructed communications 'view' of the base station 702. Under the first near-far scenario 700, both the transceiver device 706 and the user equipment 708 may have equivalent ability to accurately test neighboring base station 702 response(s) to registration request 'test' signals (e.g., incrementally or continuously increasing radio power levels emanating from a transceiver device 706 or a user equipment 708).

In this scenario 700 the distance between either the transceiver device 706 and the radio communications obstruction 704 (the distance 712), compared with the distance between the user equipment 708 and the radio communications obstruction 704 (the distance 712 added to the distance 714) may be fairly insignificant relating to most short-range radio communications environments (e.g., within a residential location). Additionally, it should be noted that in this scenario 700, the distance between the radio communications obstruction 704 and either the transceiver device 706 or the user equipment 708 is also the same.

Figure 8:
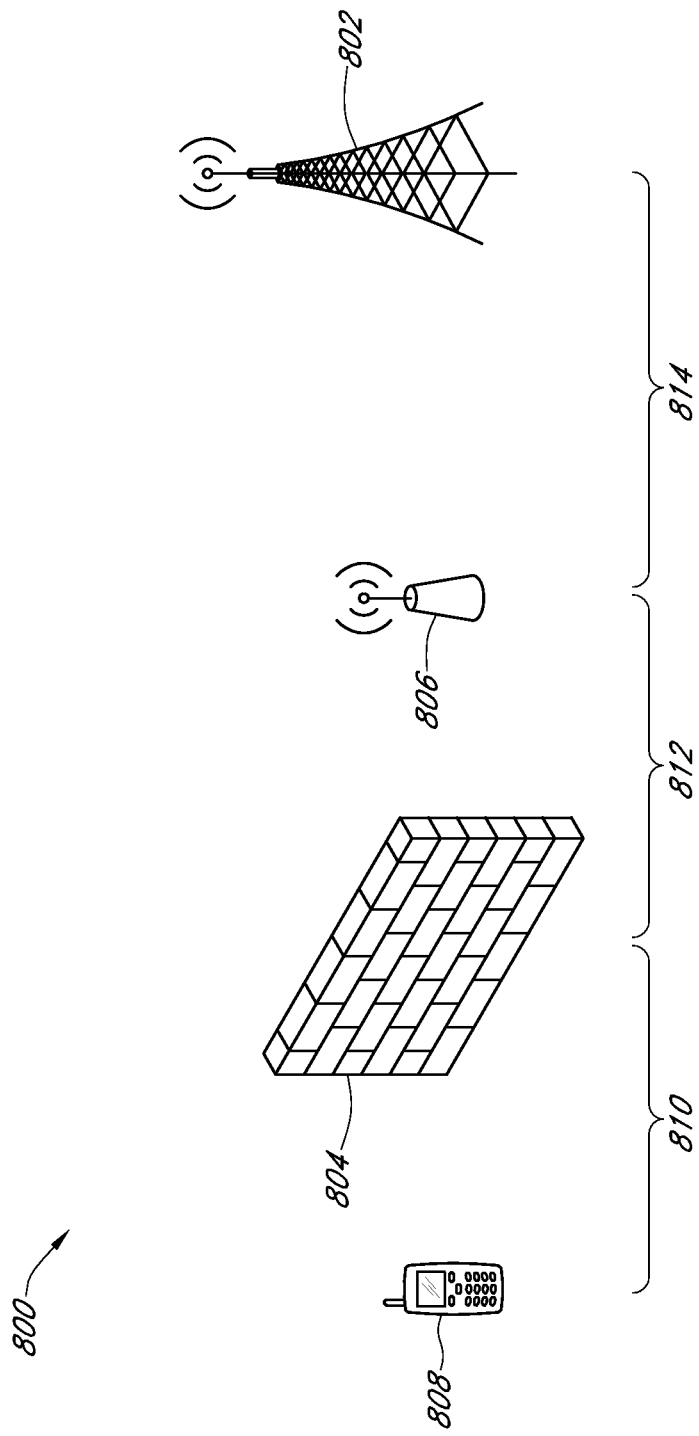
FIG. 8 illustrates a second near/far scenario that can occur amongst a user equipment, a transceiver device, and a base station in accordance with embodiments of the present invention.

FIG. 8 illustrates a second near-far scenario diagram 800 depicting a transceiver device 806, a neighboring base station 802, a radio communication obstruction 804 (represented by a brick wall), and a user equipment 808. This second near-far scenario 800 can occur in accordance with any of the embodiments of the present invention when the transceiver device 806a has a better (non-obstructed) communications 'view' of the base station 802 compared to the (obstructed) communication 'view' the user equipment 808 has of the same base station 802.

Under the second near-far scenario 800, the transceiver device 806 has a substantially better (unobstructed) view of the neighboring base station 802 than the user equipment 808, which has an obstructed view of the neighboring base station 802 due to the positioning of the radio communications obstruction 804. In this embodiment, the user equipment 808 may have lesser ability to accurately test neighboring base station 802 response(s) to registration request 'test' signals (e.g., in a operating power level/MCS refinement process) than the transceiver device 806. Accordingly, these processes (described further herein) may not be particularly helpful in accordance with the second near-far scenario 800. In this scenario 800, the distance between the transceiver device 706 and the neighboring base station 802 (distance 814) may also be significantly less than the distance between the user equipment 808 and the neighboring base station 802 (added distances 810, 812, and 814).

Figure 9:
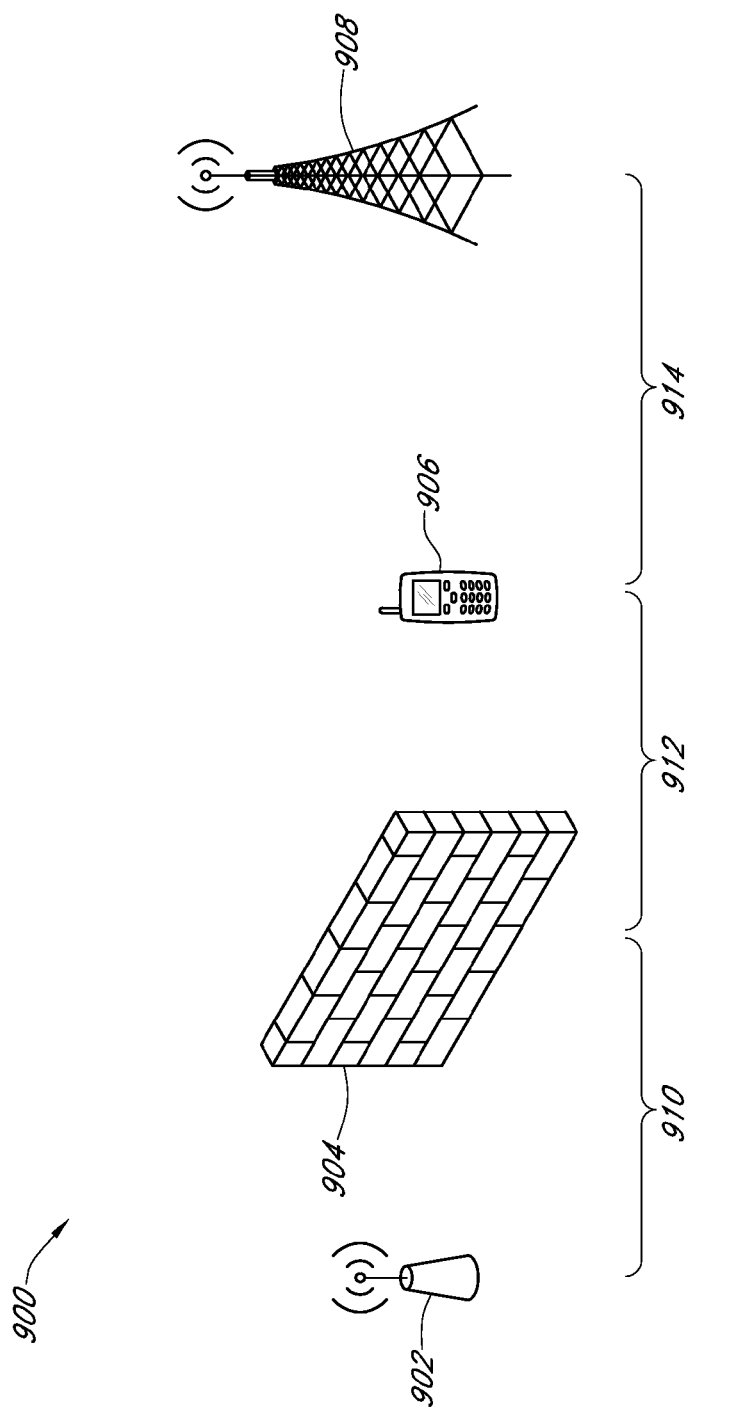
FIG. 9 illustrates a third near/far scenario that can occur amongst a user equipment, a transceiver device, and a base station in accordance with embodiments of the present invention.

FIG. 9 illustrates a third near-far scenario diagram 900 depicting a transceiver device 902, a neighboring base station 908, a radio communication obstruction 904 (represented by a brick wall), and a user equipment 906. This third near-far scenario 900 can occur in accordance with any of the embodiments of the present invention when a user equipment 906 has a better (non-obstructed) communications 'view' of the base station 908 compared to the (obstructed) communication 'view' the transceiver device 902 has of the same base station 908.

Under the third near-far scenario 900, the user equipment 906 has a substantially better (unobstructed) view of the neighboring base station 908 than the transceiver device 902, which has an obstructed view of the neighboring base station 908 due to the positioning of the radio communications obstruction 904. In this embodiment, the user equipment 906 may not need to test a neighboring base station 908 response(s) to a registration request 'test' signal (e.g., for the purpose of correcting/refining a radio power level/MCS response) because of a self-healing hand-over process, discussed further herein. Accordingly, these processes (described further herein) may not be particularly helpful in accordance with the third near-far scenario 900. In this scenario 900, the distance between the user equipment 906 and the neighboring base station 908 (distance 914) may also be significantly less than the distance between the transceiver device 902 and the neighboring base station 908 (added distances 910, 912, and 914).

In accordance with all three near-far scenarios, the process of establishing the communication operating levels for the transceiver device 706, 806, and 902 may effectively set its cell coverage size. In accordance with the second scenario 800, the cell size for the transceiver device 806 could be relatively smaller from a neighboring base station 802 interference perspective. In contrast, in accordance with the third scenario 900, the cell size for the transceiver device 902 could be relatively larger from a neighboring base station 908 interference perspective. Neither scenario 800 or 900 is optimal, particularly compared with the first scenario 700, although the third scenario 900 is potentially more serious from an interference perspective.

Further, the third scenario 900 may be 'self-healing' since the user equipment 906 would tend to be automatically handed off to the neighboring base station 906 using ordinary network mobility procedures if the user equipment's 906 view of the neighboring base station 906 was subsequently better than that of the transceiver device 902. One possible way of detecting and mitigating the various near-far scenarios discussed above would be to require prospective user equipment (e.g., any of 108a-c, 122, 124, or 126) to attempt to join a neighboring base station 106a-c using the transceiver devices 112 previously established threshold signal levels. This process may be optional, depending on the relative signal level strength between a transceiver device 112 and a user equipment (108a-c, 122, 124, or 126) opposed to the relative signal strength between a transceiver device 112 and a user equipment (108a-c, 122, 124, or 126), and/or a particular transceiver device configuration policy established by a service provider.

In an embodiment, this optional process may include the following processes: Initially a joining user equipment (e.g., 108a-c, 122, 124, or 126) is asked by a transceiver device 112 to confirm non-interfering operating levels by requesting the user equipment (e.g., 108a-c, 122, 124, or 126) attempt to join a neighboring base station 106a-c at allowed transmitted operating levels and/or MCS, which were previously determined by the transceiver device 112. Then, if the user equipment, succeeds in the attempt to join the neighboring base station 106a-c, a new (lower) maximum allowed transmitted power is determined by the user equipment (e.g., 108*a-c*, 122, 124, or 126) by successively lowering its radio levels until the join attempt fails The user equipment (e.g., 108*a-c*, 122, 124, or 126) may then reports the new (lower) operating levels to the transceiver device 112. Subsequently, the transceiver device 112 determines whether it can communicate with the user equipment (e.g., 108*a-c*, 122, 124, or 126) at the new (lower) operating levels and whether the user equipment (e.g., 108*a-c*, 122, 124, or 126) should be allowed to remain attached to the transceiver device 112. If the user equipment (108*a-c*, 122, 124, or 126) fails in the attempt to join the neighboring base station 106*a-c*, then a new (higher) maximum allowed transmitted power may be determined by the user equipment (108*a-c*, 122, 124, or 126) by successively raising its radio communications levels until the join attempt succeeds. The user equipment (108*a-c*, 122, 124, or 126) can then report the new (higher) operating levels to the transceiver device 112. In response, the transceiver device 112 determines whether the user equipment (108*a-c*, 122, 124, or 126) should be allowed to remain attached to the transceiver device 112 while using the new (higher) operating communications levels and whether the user equipment (108*a-c*, 122, 124, or 126) should be allowed to remain attached to the transceiver device 112. Once attached to the transceiver device 112, the above processes may be periodically repeated as long as the user equipment (108*a-c*, 122, 124, or 126) were otherwise not busy, to re-verify the non-interfering levels of operation for the user equipment (108*a-c*, 122, 124, or 126).

Figure 10:
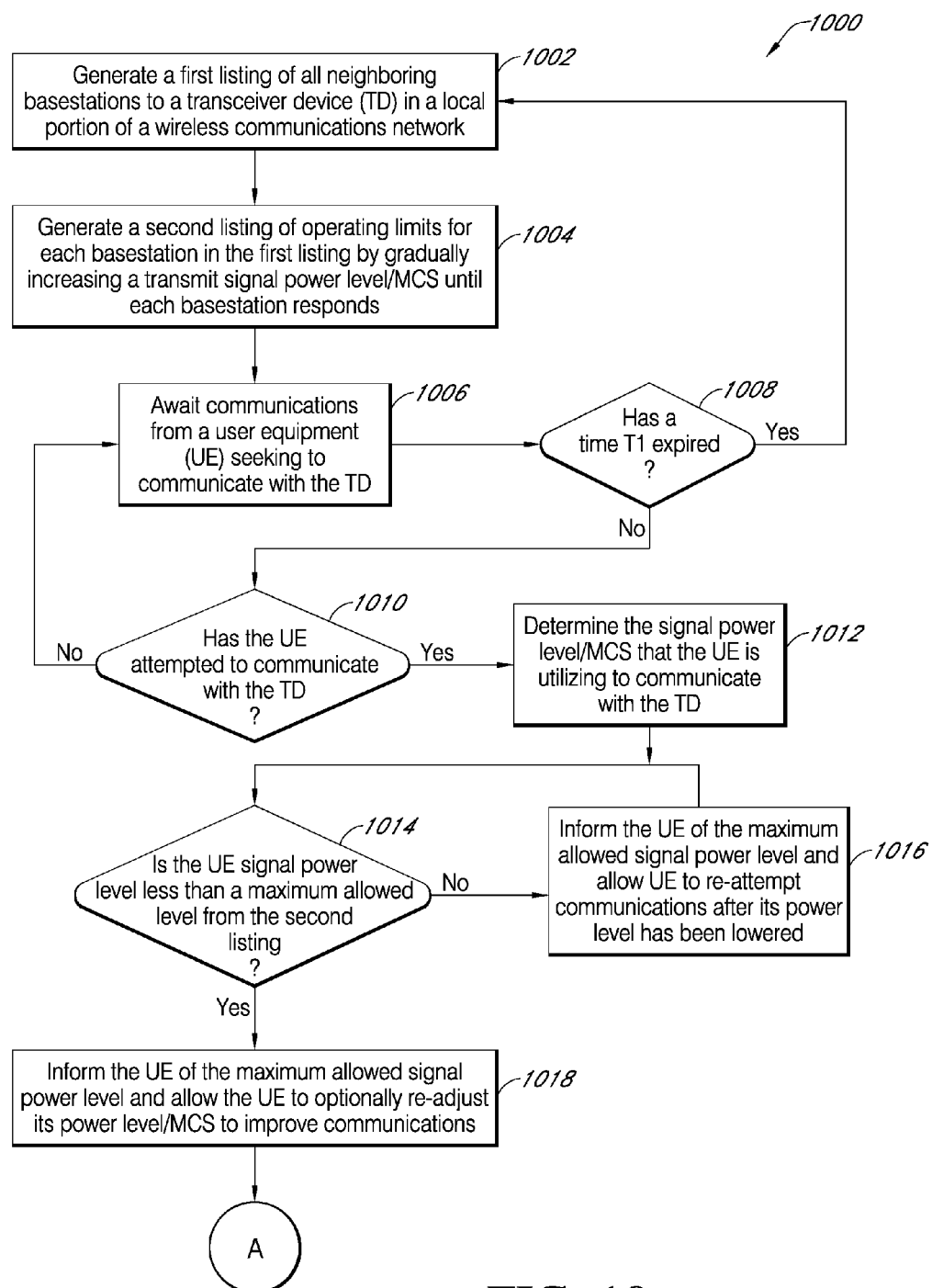
FIG. 10 illustrates a flow diagram depicting front-end processes associated with optimizing short-range wireless communications characteristics (relating to radio power operating levels/MCSs) in accordance with an embodiment of the present invention.

FIG. 10 illustrates a flow diagram 1000 depicting a flow diagram depicting front-end processes associated with optimizing short-range wireless communications characteristics (relating to radio power operating levels/MCSs) in accordance with an embodiment of the present invention. It should be understood that this process 1000 could be executed using one or more computer-executable programs stored on one or more computer-readable media located on any of the network computing system's 100 transceiver devices 112, 202*a*, 300 or collaboratively on any of the network base stations 106*a-c*, 204*a*, 206*a*, and 208*a* (or on any other common service provider device known the Art) of FIGS. 1-3. At block 1002 a first listing of all neighboring base stations 106*a-c* to a transceiver device 112 in a local portion of a wireless communications network is generated. Next, at block 1004 a second listing of operating limits for each base station 106*a-c* in the first listing is generated by gradually increasing a transmit signal power level/MCS until each neighboring base station 106*a-c* responds. Typically the MCS chosen for this process would be a test MCS level of a lowest order MCS available (e.g., a MCS employing Binary Phase Shift Keying or BPSK, having 1 bit/symbol) to improve detection and/or measurement accuracy for various subsequent neighboring base station detection processes.

Then at block 1006 the transceiver device 112 awaits communications from a user equipment (e.g., 108*a-c*, 122, 124, or 126) seeking to communicate with it. During the idle/waiting state, the process proceeds to decision block 1008 where the transceiver device 112 determines if a predetermined time threshold 'T1' has expired during an idle state. If the predetermined time threshold 'T1' has expired, the process will return to block 1002, such that the transceiver device 112 can re-generated its first listing of neighboring base stations 106*a-c* as well as its second listing of operating limits at blocks 1002 and 1004, before re-entering the idle/wait state. This can allow for an up to date listing of base stations and their respective operating limits to be maintained at the transceiver device 112 and optionally at an auxiliary service provider device.

If the predetermined time threshold 'T1' has not expired, the process will proceed to decision block 1010, where it is determined if a user equipment (e.g., 108*a-c*, 122, 124, or 126) has attempted to communicate with the transceiver device 112. If a user equipment (e.g., 108*a-c*, 122, 124, or 126) has not attempted to communicate with the transceiver device 112, then the process returns to the idle/wait state of block 1006. However, if a user equipment (e.g., 108*a-c*, 122, 124, or 126) has attempted to communicate with the transceiver device 112, then the process proceeds to block 1012 where it a signal power level/MCS that the user equipment is utilizing to communicate with the transceiver device 112 will be determined.

Subsequently, the process proceeds to decision block 1014 where it is determined if the user equipment signal power level is less than a maximum allowed level from the second listing of operating limits. If the user equipment signal power level is not less than a maximum allowed level from the second listing of operating limits, then the process proceeds to block 1016, where the transceiver device 112 informs the user equipment (e.g., 108*a-c*, 122, 124, or 126) of the maximum allowed signal power level and then allows the user equipment to re-attempt communications after its power level has been lowered. Subsequently the process reverts back to decision block 1014, to recheck if the user equipment (e.g., 108*a-c*, 122, 124, or 126) has adjusted its operating power level accordingly. However, if the user equipment signal power level is less than a maximum allowed level from the second listing of operating limits, then the process proceeds to block 1018, where the transceiver device 112 informs the user equipment (e.g., 108*a-c*, 122, 124, or 126) of the maximum allowed signal power level and then allows the user equipment to optionally re-adjust its power level/MCS to improve communications.

Figure 11:
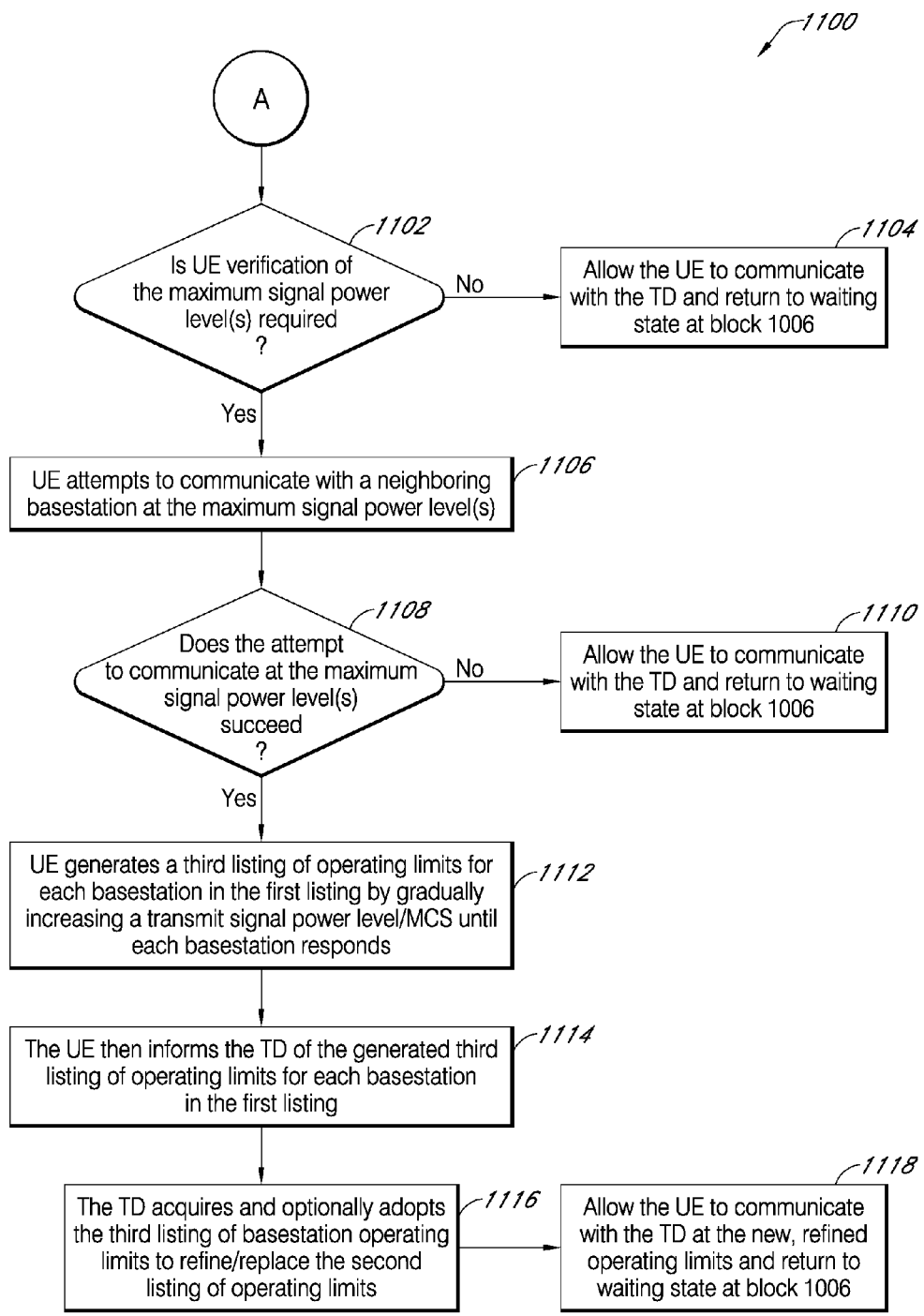
FIG. 11 illustrates a flow diagram depicting back-end processes associated with optimizing short-range wireless communications characteristics (relating to radio power operating levels/MCSs) in accordance with an embodiment of the present invention.

Next the process proceeds to decision block 1102 of FIG. 11. FIG. 11 illustrates a flow diagram 1100 depicting back-end processes associated with optimizing short-range wireless communications characteristics (relating to radio power operating levels/MCSs) in accordance with an embodiment of the present invention. It should be understood that this process 1100 could be executed using one or more computer-executable programs stored on one or more computer-readable media located on any of the network computing system's 100 transceiver devices 112, 202*a*, 300 or collaboratively on any of the network base stations 106*a-c*, 204*a*, 206*a*, and 208*a* (or on any other common service provider device known the Art) of FIGS. 1-3. At decision block 1102 it is determined if a user equipment verification of the maximum signal power level(s) is required. If a user equipment verification of the maximum signal power level(s) is not required, then the process proceeds to block 1104 where the user equipment (e.g., 108*a-c*, 122, 124, or 126) is allowed to communicate with the transceiver device 112 and then the process returns to the waiting state at block 1006. However, if a user equipment verification of the maximum signal power level(s) is required, then the process proceeds to block 1106, where the user equipment (e.g., 108*a-c*, 122, 124, or 126) attempts to communicate with a neighboring base station at the maximum signal power level(s).

Then at decision block 1108 it is determined if the user equipment's attempt to communicate with a neighboring base station at the maximum signal power level(s) succeeds. If the attempt to communicate with a neighboring base station 106*a-c* at the maximum signal power level(s) does not succeed, then the process proceeds to block 1110 where the user equipment (e.g., 108*a-c*, 122, 124, or 126) is allowed to communicate with the transceiver device 112, and then the process returns to the waiting state at block 1006. If the attempt to communicate with a neighboring base station 106*a-c* at the maximum signal power level(s) succeeds, then the process proceeds to block 1112, where the user equipment (e.g., 108*a-c*, 122, 124, or 126) generates a third listing of operating limits for each neighboring base station 106*a-c* in the first listing by gradually increasing a transmit signal power level/MCS until each base station 106*a-c* responds. Subsequently, the process proceeds to block 1114 where the user equipment (e.g., 108*a-c*, 122, 124, or 126) then informs the transceiver device 112 of the generated third listing of operating limits for each base station 106*a-c* in the first listing. Next the process proceeds to block 1116 where the transceiver device 112 acquires and optionally adopts the third listing of base station operating limits to refine or replace the second listing of operating limits. Then the process proceeds to block 1118 where the user equipment (e.g., 108*a-c*, 122, 124, or 126) is allowed to communicate with the transceiver device 112 at the new, refined operating limits and then the process returns to the waiting state at block 1106.

In accordance with an embodiment of the present invention, a transceiver device 112 (e.g., a femtocell or picocell device) may determine its initial safe maximum radio power levels based on existing neighboring base stations' 106*a-c* (macrocell, microcell, and/or picocell base stations) communications within its portion of a larger wireless network. The transceiver device 112 may be configured to use the determined power levels to regulate which user equipment (e.g., 108*a-c*, 122, 124, or 126) units can roam onto it and what radio operating limits the user equipment must observe once attached to the transceiver device 112.

In accordance with various embodiments of the present invention the following communications scenarios may be facilitated by present invention. In a first scenario, a consumer purchases a transceiver device 112 from their service provider to improve the local cell coverage within their home. The user then takes the transceiver device 112 home and sets it up in their home office. When the transceiver device 112 is first turned on it may begin a process to determine its neighboring base stations 106*a-c*. For each detected neighboring base station 106*a-c* the transceiver devices 112 determines the largest operating radio power level that will not interfere with the operations of its neighboring base stations 106*a-c*. Once this process is completed, the transceiver device 112 uses the determined operating levels to regulate whether the user's user equipment (e.g., 108*a-c*, 122, 124, or 126) can attach to it and what radio power limits the user equipment must observe.

In a second scenario, the user in the first scenario may unplug the transceiver device 112 and takes it into a city apartment in a tall high-rise building. When the unit is first turned on it begins its scan to determine the neighboring base stations 106*a-c* and safe, non-interfering radio power output levels. Because of the transceiver device's 112 location, high above the city, the transceiver device 112 may detect many neighboring base stations 106*a-c* and the safe communications output levels determined may be sharply reduced in magnitude, compared to the first home office use scenario.

In an embodiment, the invention may operate by the transceiver device 112 operating in a user equipment mode, where it detects neighboring base stations 106*a-c* in the user equipment mode. While detecting neighboring base stations 106*a-c*, the transceiver device 112 can measure the minimum and maximum transmitted energy that can be seen by neighboring base stations 106*a-c* in order to estimate the safe non-interfering radio operating levels for the local transceiver device's 112 attached user equipment (e.g., 108*a-c*, 122, 124, or 126). After the transmitted radio operation levels are established, the transceiver device 112 uses these levels to regulate the conditions under which user equipment may attempt and operate, with the goal of minimizing interference to the surrounding communications networks. The transceiver device 112 may be configured to periodically repeat neighboring base stations 106*a-c* detection in order to self-adjust its operating level to account for network infrastructure changes and cases where the neighboring base stations 106*a-c* might be relocated.

In an embodiment, in order for a transceiver device 112 to detect a nearby neighbor base stations 106*a-c* it may operate in user equipment mode to scan for regional base stations 106*a-c*. The process of detecting neighbor base stations 106*a-c* may be accelerated by using an external-network provided list of potential neighbor base stations 106*a-c*, or by using historical base station data. In accordance with an embodiment of the present invention these lists may be affiliated with the neighboring base station parameters/characteristics listing 602 of FIG. 6. Upon detecting one or more neighbor base stations 106*a-c*, the transceiver device 112 may attempt to perform initial network entry by incrementally or continuously increasing its transmitted signal power starting at an initial threshold level (e.g. zero dBm) until each neighbor base station 106*a-c* first responds to the increasing power level/registration request. The transceiver device 112 may optionally continue with network entry in order to perform channel quality estimation with the neighboring base stations 106*a-c* to further refine estimates of the threshold level.

The transceiver device 112 may use this detection threshold level as the reference level for establishing non-interfering maximum transmitted equivalent isotropically radiated power (EIRP) levels and/or the minimum modulation and coding scheme (MCS) for its local cell uplink and downlink channels. The procedure may be repeated periodically to maintain accuracy with possible system infrastructure changes and/or upgrades.

In an embodiment, whenever a user equipment (e.g., 108*a-c*, 122, 124, or 126) attempts to register onto the transceiver device 112, the transceiver device 112 may use the previously established maximum EIRP levels and/or minimum MCS in order to enforce the levels that the transceiver device and user equipment (112 and 108*a-c*, 122, 124, or 126) use while communicating. Once a user equipment (e.g., 108*a-c*, 122, 124, or 126) attaches to the transceiver device's 112 cell, the transceiver device 112 may request the user equipment (e.g., 108*a-c*, 122, 124, or 126) to attempt to register with a neighboring base station 106*a-c* to verify the transceiver device's 112 reference threshold levels which then may be readjusted lower if necessary. The procedure establishes the operating levels of the transceiver device's 112 coverage cell that minimize interference with the surrounding neighboring base stations 106*a-c*.

In accordance with various embodiments of the present invention the basic short-range optimization processes consist of three main steps, as follows:

1) a transceiver device 112 scans for all neighboring base stations 106*a-c* (e.g., with slow periodic scans, such as one scan per hour) and builds a neighboring base stations list (partially depicted in the neighboring base station parameters/characteristics listing 602 of FIG. 6);

2) the transceiver device 112 then scans minimum required entry levels (radio power/MCS) for the neighboring base stations 106*a-c* and builds its no interfering operating levels list (partially depicted in the neighboring base station parameters/characteristics listing 602 of FIG. 6); and 3) When a user equipment (e.g., 108*a-c*, 122, 124, or 126) attempts to join the transceiver device 112, the transceiver device 112 informs the user equipment of the maximum allowed operating levels (depicted in the non-interfering operating levels listing 604 of FIG. 6).

In accordance with an embodiment of the present invention, a process flow may begin with the transceiver device 112 building its neighbor base station list (e.g., See 602 of FIG. 6). This process may begin when the transceiver device 112 is initially powered up. The transceiver device 112 operates in user equipment mode to perform the scan (e.g., the transceiver device 112 may attempt to enter/register on a neighboring base station channel as an ordinary user equipment 108*a-c*, 122, 124, or 126). The list may be generated by ordinary channel scanning techniques or by the transceiver device 112 receiving a pre-configured list from the network service provider or another service provider device.

Next, using the list, the transceiver device 112 attempts to join each neighboring base station 106*a-c* from the list which may be prioritized by estimated signal quality. The transceiver device 112 may then attempt to join a neighboring base station 106*a-c* by successively increasing its transmitted power level and/or MCS robustness until the neighboring base station 106*a-c* first hears the join attempt and responds. The transceiver device 112 may then use this threshold operating level to derive the operating limits for its own local cell assuming that the user equipment (108*a-c*, 122, 124, or 126) attached to it will have a similar signal quality view of the remote neighboring base station(s) 106*a-c*. The transceiver device 112 may then save the operating level thresholds for each neighboring base station 106*a-c* in a list for later reference (e.g., See 602 and 604 of FIG. 6). The transceiver device 112 may then enter an idle state awaiting a user equipment (108*a-c*, 122, 124, or 126) to attempt to join (82). Periodically, whenever a countdown timer T1 expires the transceiver device 112 may repeat the process of determining the operating thresholds to maintain current listings.

While in the Idle state, if a user equipment (108*a-c*, 122, 124, or 126) attempts to join the transceiver device 112, the transceiver device 112 evaluates whether the attempt is made at a signal level below the pre-determined threshold (e.g., See 604 of FIG. 6). If the user equipment (108*a-c*, 122, 124, or 126) attempts to join with a signal level that exceeds the threshold, the transceiver device 112 may inform the user equipment (108*a-c*, 122, 124, or 126) of the current threshold level and generally the transceiver device 112 will then ignore the attempt. This allows a user equipment (108*a-c*, 122, 124, or 126) to reset its maximum allowed power levels and retry the attempt.

If the user equipment (108*a-c*, 122, 124, or 126) attempts to join with a signal level lower than the pre-determined threshold the transceiver device 112 may inform the user equipment (108*a-c*, 122, 124, or 126) of the current threshold level, which allows a user equipment (108*a-c*, 122, 124, or 126) to reset its maximum allowed power levels for improved communication with the transceiver device 112, if needed.

Based on the transceiver device 112 configuration or relative signal levels, the transceiver device 112 may request the user equipment (108*a-c*, 122, 124, or 126) to perform its own estimation of the neighboring base station signal quality using a process similar to that used by the transceiver device 112 during its initial scanning process. If verification is not required, then the user equipment (108*a-c*, 122, 124, or 126) attempts to join the neighboring base station 106*a-c* using the transceiver device 112 provided threshold levels (e.g., See 604 of FIG. 6).

If the user equipment/neighboring base station join attempt fails, then the user equipment (108*a-c*, 122, 124, or 126) may be allowed to join the transceiver device 112 normally while observing the threshold operating levels. Optionally, the transceiver device 112 could request the user equipment (108*a-c*, 122, 124, or 126) to perform its own estimation of the threshold operating levels.

If the user equipment/neighboring base station join attempt succeeds, then the user equipment (108*a-c*, 122, 124, or 126) may be requested to perform its own estimation of the threshold levels of operation for avoiding interference with the neighboring base station(s) 106*a-c* using a procedure similar to the one used by the transceiver device 112 during its initial scan. With this process completed, the transceiver device 112 may be notified, by the user equipment (108*a-c*, 122, 124, or 126), of the new (lower) operating threshold level and the user equipment (108*a-c*, 122, 124, or 126) may then be allowed to join the transceiver device 112 while observing this new threshold. Depending on the new threshold, the transceiver device 112 might determine that its communication with the user equipment (108*a-c*, 122, 124, or 126) is not possible or is inefficient and reject the user equipment join attempt.

In accordance with an embodiment of the present invention, the transceiver device 112 operates in user equipment mode in order to perform initial network entry to a neighbor base station 106*a-c* at successively higher power levels. The transceiver device 112 uses its transmit radio channel to send the registration requests to the neighbor base station(s) 106*a-c*. The information may then be used to determine the safe operating levels for user equipment (108*a-c*, 122, 124, or 126) that attach to the transceiver device 112.

An alternative method for determining the threshold interference levels may include using the transceiver device 112 receive radio channel to scan for neighbor base stations 106*a-c* transmissions (e.g., synchronization or other broadcast messages). On detecting a neighbor base station 106*a-c*, the transceiver device 112 uses the received signal level to determine the path loss between it and the neighbor base station 106*a-c*. To make this determination the transceiver device 112 generally needs to know the originating transmission power level of the neighbor base station 106*a-c*.

The neighbor base station 106*a-c* may communicate this to the transceiver device 112 in one of several ways. For example, in systems where the transceiver device nodes were internetworked directly (e.g., in X2 in LTE networks) or via intermediaries (e.g., R4 between ASN-GN's in Wi-MAX™ networks) the transceiver device 112 could send a request message to the neighbor base station 106*a-c* to query its current transmission power setting. Another method could be if the broadcast message itself contained the power level along with the neighbor base station 106*a-c* identity. By knowing the difference between the neighbor's transmission power and the transceiver device 112 received signal level the transceiver device 112 may be capable of determining the path loss between the devices. A path loss estimate of the safe operating levels for the transceiver device 112 and its own attached user equipment (108*a-c*, 122, 124, or 126) can then be determined.

Once a user equipment (108*a-c*, 122, 124, or 126) joins the transceiver device 112 network it could use a similar procedure to determine its own view of the channel quality between the user equipment (108*a-c*, 122, 124, or 126) and neighbor base stations 106*a-c* (e.g., as an alternative to determine the same information by attempting network entry). This information could be used to identify scenarios where the user equipment (108a-c, 122, 124, or 126) has a significantly different channel path to the neighbor base station 106a-c and, relaying this information to the transceiver device 112, the transceiver device 112 could adjust the operating levels to the user equipment (108a-c, 122, 124, or 126) appropriately to avoid interfering with a neighbor base station 106a-c.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for optimizing short-range wireless communications within a distributed wireless communications network, the networked computing system comprising:
a first base station having a first coverage area;
a second base station having shorter range wireless communications capability and a second coverage area, the second coverage area being smaller than the first coverage area, the second coverage area having an overlap area that overlaps with the first coverage area; and
a user equipment being located within the overlap area and capable of communicating with the first and second base stations,
wherein the second base station is configured to:
transmit a registration request signal to the first base station in order to connect to the first base station; and
determine at least one operating parameter for the second base station based on communications characteristics associated with the first base station.

2. The networked computing system of claim 1, wherein the at least one operating parameter is a non-interfering operating power level or a modulation and coding scheme level utilized to facilitate communications between the second base station and the user equipment.

3. The networked computing system of claim 1, wherein the second base station determines the at least one operating parameter by increasing a power level of the registration request signal until an acknowledgment from the first base station is received by the second base station.

4. The networked computing system of claim 1, wherein the at least one operating parameter is utilized to set operating levels for communication with the user equipment when the user equipment attempts to communicate with the second base station.

5. The networked computing system of claim 1, wherein the second base station instructs the user equipment to communicate with the first base station to determine at least one refined communications operating level based on the communications characteristics associated with the first base station.

6. The networked computing system of claim 5, wherein the at least one refined communications operating level is utilized to facilitate improved communications between the second base station and the user equipment, such that the second base station and the user equipment can communicate within the distributed wireless communications network without causing substantial interference.

7. A non-transitory computer readable medium encoded with computer executable instructions for optimizing short-range wireless communications within a distributed wireless communications network, which when executed, performs a method comprising:
transmitting a registration request signal to a first base station from a second base station, the first and second base stations having first and second coverage areas, respectively, the second coverage area being smaller than the first coverage and having an overlap area that overlaps with the first coverage area, the registration request signal being used to connect to the first base station by the second base station; and
determining at least one operating parameter for the second base station based on communications characteristics associated with the first base station.

8. The non-transitory computer readable medium of claim 7, wherein the at least one operating parameter is a non-interfering operating power level or a modulation and coding scheme level utilized to facilitate communications between the second base station and a user equipment.

9. The non-transitory computer readable medium of claim 7, wherein the second base station determines the at least one operating parameter by increasing a power level of the registration request signal until an acknowledgment from the first base station is received by the second base station.

10. The non-transitory computer readable medium of claim 7, wherein the at least one operating parameter is utilized to set operating levels for communications with a user equipment that attempts to communicate with the second base station, the second base station being a femtocell.

11. The non-transitory computer readable medium of claim 7, wherein the second base station instructs a user equipment to communicate with the first base station to determine at least one refined communications operating level based on communications characteristics associated with the first base station.

12. The non-transitory computer readable medium of claim 11, wherein the at least one refined communications operating level is utilized to facilitate improved communications between the second base station and the user equipment, such that the second base station and the user equipment can communicate within the distributed wireless communications network without causing substantial interference.

13. A computer implemented method for optimizing short-range wireless communications within a distributed wireless communications network, the method comprising:
transmitting a registration request signal to a first base station having a first coverage area by a second base station having a second coverage that is smaller than the first coverage area;
receiving an acknowledgment of the registration request signal from the first base station by the second base station; and
determining at least one operating parameter of the second base station based on communications characteristics associated with the first base station using the acknowledgment received.

14. The computer implemented method of claim 13, wherein the at least one operating parameter is a non-interfering operating power level or a modulation and coding scheme level utilized to facilitate communications between the second base station and a user equipment.

15. The computer implemented method of claim 13, wherein a power level of the registration request signal being transmitted to the first base station is increased until the acknowledgment is received from the first base station.

16. The computer implemented method of claim 13, wherein the at least one operating parameter is utilized to set operating levels for communications with a user equipment attempting to communicate with the second base station.

17. The computer implemented method of claim 13, wherein the second base station instructs a user equipment to communicate with the first base station to determine at least one refined communications operating level based on communications characteristics associated with the first base station.

18. The computer implemented method of claim 17, wherein the at least one refined communications operating level is utilized to facilitate improved communications between the second base station and the user equipment, such that the second base station and the user equipment can communicate within the distributed wireless communications network without causing substantial interference.

19. A base station comprising:
   at least one memory;
   a communications component; and
   at least one processor,
   wherein the base station is configured to:
      transmit a registration request signal to another base station having a first coverage area using the communications component, the first coverage area being bigger than a second coverage of the base station;
      receiving an acknowledgment of the registration request signal from the first base station by the base station; and
      determine at least one operating parameter of the base station based on communications characteristics associated with the another base station using the acknowledgment received.

20. The transceiver device of claim 19, wherein the at least one operating parameter is a non-interfering operating power level or a modulation and coding scheme level utilized to facilitate communications between itself and a user equipment, and
   wherein a power level of the registration request signal is increased until the acknowledgment is received from the regional base station.

* * * * *